Sept. 11, 1962 L. PRICE Re. 25,240

GAUGE MOUNTING

Original Filed Aug. 18, 1954 2 Sheets-Sheet 1

INVENTOR.
LEO PRICE
BY Wendling & Frank
Attorneys

INVENTOR.
LEO PRICE
BY
Wendling and Ford,
Attorneys

United States Patent Office

Re. 25,240
Reissued Sept. 11, 1962

25,240
GAUGE MOUNTING

Leo Price, Cleveland, Ohio, assignor to Winslow Manufacturing Company, a corporation of Ohio Original No. 2,709,854, dated June 7, 1955, Ser. No. 450,650, Aug. 18, 1954. Application for reissue Sept. 8, 1958, Ser. No. 759,833
6 Claims. (Cl. 33—174)

Matter enclosed in heavy brackets [ ] appears in the original patent but forms no part of this reissue specification; matter printed in italics indicates the additions made by reissue.

My invention relates to gauging devices and more particularly to gauging devices utilizing guillotine gauge blades.

An object of my invention is the provision of an improved construction of a mounting for gauge blades adapted for flexibility in gauging of different articles.

Another object is the provision of a mounting for guillotine gauge blades so constructed as to permit different arrangements and disposition of the gauge blades with the use of one base member as a foundation.

Another object is the provision of a base member so constructed and arranged that guillotine gauge blades may be mounted thereon in a plurality of positions and arrangements as required for different articles.

Another object is the provision of standard parts for a gauge mounting so constructed as to provide for flexibility in arranging a plurality of gauging positions for guillotine gauge blades.

Another object is the provision for economy and efficiency in the construction of mounting means for guillotine gauge blades.

Another object is the provision for obtaining results not heretofore known and in a manner not heretofore obtainable.

Other objects and a fuller understanding of my invention may be had by referring to the following description and claims, taken in conjunction with the accompanying drawing, in which:

Figure 1:
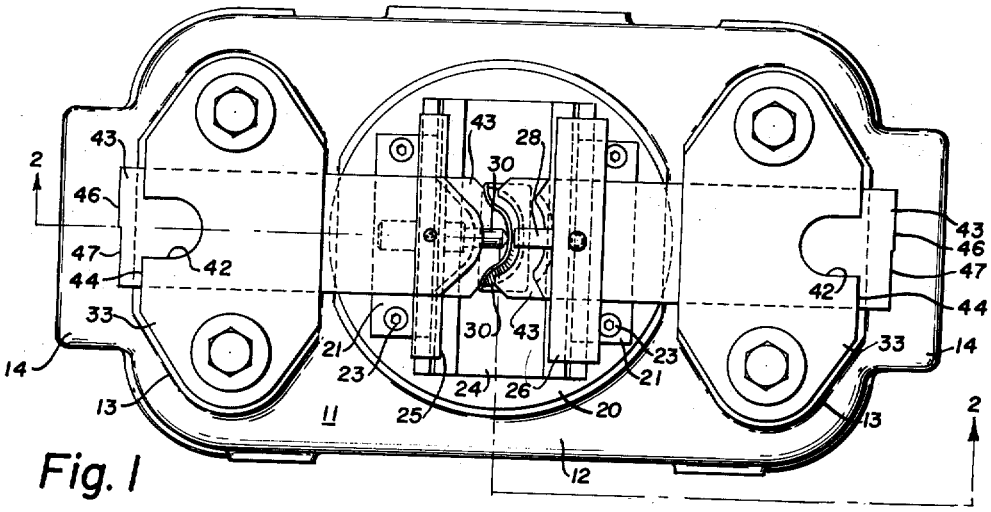
FIGURE 1 is a plan view of a gauging device embodying my invention.
Figure 2:
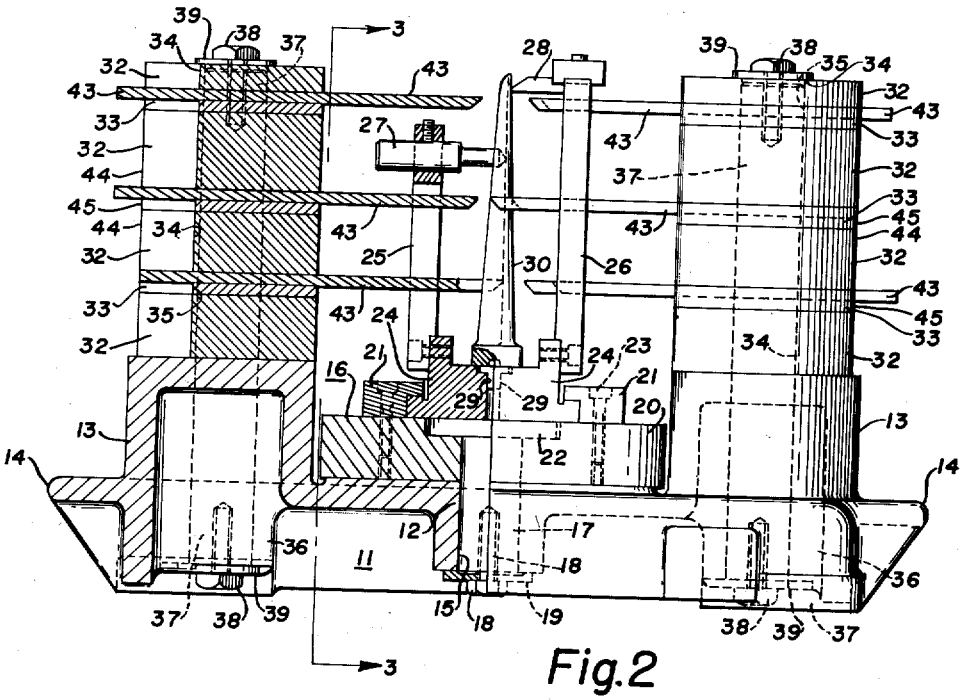
FIGURE 2 is a side view of the device shown in FIGURE 1, partly in section and partly in elevation, and taken along the line 2—2 of FIGURE 1.
Figure 3:
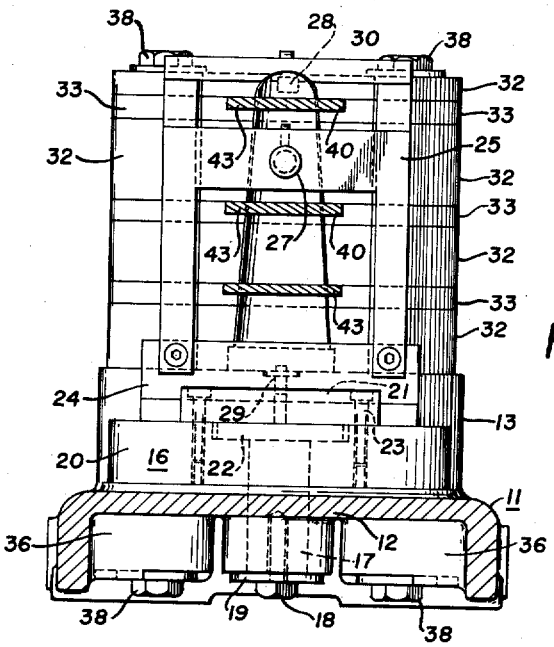
FIGURE 3 is a cross-sectional view of my device taken along the line 3—3 of FIGURE 2.

Guillotine gauge blades are utilized for gauging the dimensions and contour of many types of articles. One of the typical articles gauged with guillotine gauge blades is the bucket or blade of a turbine engine. I have illustrated my device with such an article to be gauged. Differently shaped and sized articles require different gauge blades and also different positioning of the gauge blades. For example, a relatively long article will require one spacing of gauge blades, whereas a shorter article will require another spacing of gauge blades. The requirements for gauges of this type have usually required the building of entirely different mountings for the gauge blades. This has been uneconomical and burdensome for the construction of a considerable number of mountings for gauge blades. It has also required the complete disassembly and rebuilding of the entire mounting when the devices are to be repaired and reset. The difficulties and expense encountered in both the original construction of the mountings for guillotine gauge blades and for the repair and reconstruction of the mountings is well known to those acquainted with the use of such devices.

It will be apparent from a consideration of my device as herein described and disclosed that with standard parts and with a minimum of changes, a great flexibility is obtained in constructing different gauge blade mountings for gauging different articles. It will also be appreciated that the repair and reconstruction of the mountings will require a minimum of parts and work, rather than the complete reworking of many parts as required under former practice.

In the embodiment of my device disclosed in the drawings, the reference character 11 denotes generally the base member used for the mounting. The base member 11 is disposed generally in a horizontal plane having a central portion 12 over which an article to be gauged is positioned, which central portion 12 is embraced by opposite end portions of the base member 11. Adjacent the opposite ends of the base member 11 are raised end portions 13 forming generally elliptical columns standing up from the flat horizontal surface of the base member. At the opposite ends of the base member there are handles 14 provided for handling the device.

Extending through the central portion 12 of the base member, there is a central opening or hole 15, the metal of the base member being thickest around the opening 15 to provide a bushing integral with the base member. It is to be noted that the axis of this opening 15 provides a primary reference line from which are determined the locations and positions of other parts and openings in my device hereinafter described.

An orienting device denoted generally by the reference character 16 is shown positioned over the central portion 12 of the base member. This orienting device is adapted to hold or align an article, such as the turbine blade 30, in proper position to be engaged by guillotine gauge blades 43. The orienting device 16 comprises a round block 20 secured to the base member 11 by means of a center pin or bolt 17, the head 22 of the pin or bolt 17 firmly engaging in a recess in the top of the block 20. A threaded bolt 18 threadably engages in a threaded opening in the lower end of the pin 17 and a washer 19 is positioned between the head of the threaded bolt 18 and the bottom of the bushing around the opening 15. Thus, the block 20 of the orienting device 16 is held firmly in a true position relative to the primary reference line of the device.

A movable article holder 24 is reciprocally movable across the block 20 by means of slideway members 21 bolted to the block 20 by bolts 23. In this way, the transverse position of the article holder 24 may be adjusted. After the article holder 24 is in the proper position, then all of the bolts 23 and the bolt 18 are thoroughly tightened so as to hold the orienting device 16 in secure position relative to the primary reference line and the base member.

Bolted to the article holder 24 are two upright members 25 and 26. A biased article-engaging finger 27 is carried at the upper end of the upright member 25 and a fixed article-engaging finger 28 is carried at the upper end of the upright member 26. There is a recess 29 centrally located in the block 24 which is adapted to accommodate an extension or locating boss formed on the bottom end of article 30. By placing an article 30 in the position shown in the drawings, such that the extension or boss sets in the recess 29, such that the fixed finger 28 engages the upper end of the article 30 on one side, and such that the finger 27 engages the article 30 at another location on its opposite side, then the article 30 will be held in correct alignment and ready to be gauged by the guillotine gauge blades 43.

Figure 4:
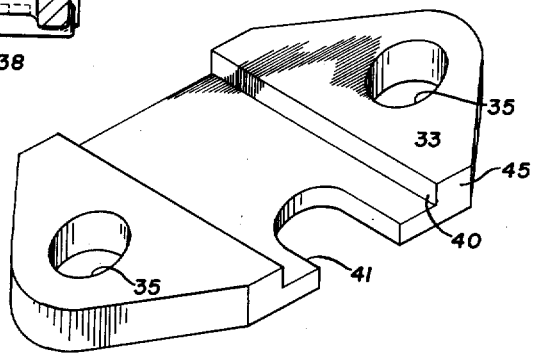
FIGURE 4 is an enlarged perspective view of a guide block utilized in my device.
Figure 5:
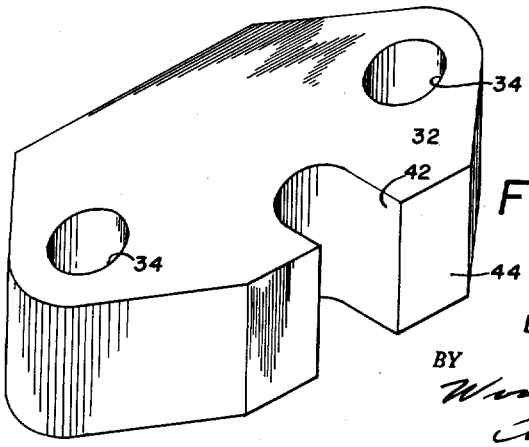
FIGURE 5 is an enlarged perspective view of a spacer block utilized in my device.

The several guillotine gauge blades are to be slidably mounted at predetermined elevations, depending upon the size and shape of the article to be gauged. The gauge blades 43 are arranged in pairs so that the blades of each pair are on the same level and directed in opposition to each other. To provide for carrying the gauge blades at the proper elevation with respect to a particular article to be gauged, I provide a plurality of spacer blocks 32 and a plurality of guide blocks 33. The detailed construction of a spacer block 32 is shown in FIGURE 5 and the detailed construction of a guide block 33 is shown in FIGURE 4. Half of the guide blocks and spacer blocks are alternately stacked over one raised portion 13 of the base member 11 and the other half of the spacer blocks and guide blocks are alternately stacked over the other raised portion of the base member 11. The number of guide blocks 33 to be used depends upon the number of pairs of gauge blades to be utilized. The number and size of spacer blocks 32 to be utilized depends upon the desired elevation of the respective pairs of opposed gauge blades. Preferably the thickness of the guide blocks is a modulus of the thickness of the spacer blocks. For example, the spacer block 32 in FIGURE 5 is three times the thickness of the guide block 33 in FIGURE 4. Other proportions of thicknesses may be utilized. Also, of course, spacer blocks of any desired thickness may be utilized in order to meet the requirements of the particular mounting to be assembled. If desired to accommodate other gauge blades or to accommodate other arrangements, also other thicknesses of guide blocks 33 may be utilized.

Each of the spacer blocks 32 has a pair of round openings 34 extending therethrough from top to bottom. Similarly, each of the guide blocks 33 has a pair of round openings 35, of the same diameter as openings 34, extending therethrough from top to bottom. The spacing between the axes of openings 34 of all of the spacer blocks 32 is the same as the spacing between the axes of the pair of openings 35 in all of the guide blocks 33. Thus, upon stacking together spacer blocks 32 and guide blocks 33 in any desired arrangement, all of the openings 34 and 35 on one end of the blocks will register and all of the openings 34 and 35 on the other end of the blocks will register.

Extending downwardly from the base member 11 below each raised portion 13 are two bushing portions 36. Each bushing portion 36 has a vertical opening extending therethrough and the openings through these bushings are of the same diameter as the diameter of the openings 34 and 35. Also the spacing between the axes of the openings in the bushings 36 is the same as the spacing between the axes of openings 34 in each spacer block and the spacing between the axes of the openings 35 in each guide block. Therefore, upon stacking of spacer blocks and guide blocks over the raised portions 13, the openings 34 and 35 of the several blocks are in alignment with and register with the internal openings of the two spaced bushings 36 below each raised portion 13.

Extending through the aligned and registered openings through the stacked blocks and through the bushings 36 of the base member, there are pin members 37 which complementarily and closely fit within the registered openings. The fit of the pin member 37 in the several aligned and registered openings is such that the lateral position of the several blocks 32 and 33 is fixed and therefore the blocks 32 and 33 are at stationary and predetermined positions relative to the primary reference line coinciding with the axis of the central opening 15. Threaded bolts 38 engaging washers 39 are threadably engaged to the upper and lower ends of the pin members 37 in such a manner as to firmly hold the pin member 37 in position and to tightly secure the stacked blocks 32 and 33 together and to the base member. It is to be noted that the axes of the openings in the bushing portions 36 of the base member are in fixed and predetermined positions relative to the primary reference line coinciding with the axis of the central opening 15. Also the axes of the openings through the four bushing portions 36 are vertical and parallel to each other, as well as to the said primary reference line. Therefore, the spacer blocks and guide blocks are held in true alignment in vertical position and in true relationship to the said primary reference line.

Each of the guide blocks 33 has a transverse channel 40 formed in a side thereof. This channel 40 accommodates in a sliding fit a guillotine gauge blade 43. A gauge blade 43 may slide in horizontal direction toward and away from the primary reference line and is held in proper guided elevation by a guide block 33 and by a spacer block 32 assembled next to the guide block 33 and over the channel 40.

To provide finger access to the outer end portion of the gauge blades 43, there is provided in the guide blocks 33 an open space 41 and also provided in the spacer blocks 32 is an open space 42. These open spaces or recesses 41 and 42 are also in alignment with each other and permit the fingers of an operator to move into the open spaces 41 and 42 to seize and manipulate a guillotine gauge blade 43 within the respective guide block 33.

On the outer side of each guide block 33 is a surface denoted by the reference character 45. Also on an outer side of each spacer block 32 is a surface denoted by the reference character 44. These surfaces 44 and 45 of each stack of blocks are aligned in a single vertical plane. This vertical plane constitutes a reference plane for comparing the position of a gauge blade 43 in respect to this [horizontal] *vertical* plane. The gauging is done by moving the gauge blades 43 into firm engagement with the article 30 and the position of the rear end of the gauge blades in respect to the reference plane provided by surfaces 44 and 45 determines the gauging of the article. Plus or minus gauging of the article is provided for by two end surfaces 46 and 47 on the end of each gauge blade 43. Thus, at surface 46, the gauge blade is slightly longer than it is at surface 47. These end surfaces 46 and 47 are compared with the reference plane provided by the side surfaces 44 and 45 through the sense of feeling in the fingers of the operator or through sight in comparing the position of these end surfaces 46 and 47 relative to the vertical reference plane.

By the arrangement described, it will be appreciated that different articles may be accommodated and a mounting provided for the guillotine gauge blades with a minimum of changes or substitutions. The same base member may be utilized for many arrangements and the spacer blocks and guide blocks rearranged to meet the required conditions. Spacer blocks of different thicknesses may be utilized as required. Inasmuch as all of the parts of the base member are related to the primary reference line and inasmuch as the size of the several blocks and of the openings therein is related to the base member and its openings, a true and accurate mounting is provided for the guillotine gauge blades in a variety of arrangements utilizing the several parts as herein described.

The present disclosure included that contained in the appended claims as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A gauging device comprising in combination an elongated base member, said base member having a reference point intermediate of its opposite ends, aligning means carried by said base member and positioned relative to said reference point for aligning an article to be gauged, said base member having adjacent each of its opposite ends a pair of openings having axes parallel to each other and to the axes of the openings of the other pair of openings, straight lines between the axes of the openings of each pair of openings being spaced equidistantly from said reference point and intersecting at right angles a line passing through said reference point, a plurality of guide blocks, a plurality of spacer blocks, a first group of said guide blocks and spacer blocks being alternately stacked over said base member adjacent one of its opposite ends and a second group of said guide blocks and spacer blocks being alternately stacked over said base member adjacent the other of its opposite ends, the blocks of each group of alternately stacked guide blocks and spacer blocks having a pair of openings extending therethrough, the pairs of openings in said stacked blocks registering and the pairs of openings in said base member being in alignment, respectively, and pin members extending through the aligned openings of said stacked groups of guide blocks and spacer blocks and of said base member and securing the stacked groups of guide blocks and spacer blocks to said base member, each of said guide blocks having a channel formed in a face thereof and disposed transversely of the guide block and longitudinally of the base member, each said channel being adapted to slidably receive and guide a guillotine gauge blade movable through the channel in a horizontal plane, each said guide block having a side forming a reference plane at the end of said channel for comparing a position of a said blade in the channel with the said side, said sides of the stacked guide blocks of each group being in a common plane parallel to the said common plane of the other group, the guide blocks and spacer blocks of each group having aligned open spaces adjacent said common plane to provide finger access to blades in said channels.

2. A gauging device comprising the combination of a base member having a central portion and opposite end portions, an orienting device secured to said central portion, said orienting device being adapted to orient an article to be gauged relative to a reference line passing vertically through said central portion, a first group and a second group of alternately stacked guide blocks and spacer blocks, each group being positioned over one of said end portions of the base member, each group of blocks and respective base member end portions having a pair of spaced and vertically extending openings, the openings of said blocks and base member being in registration, the axes of the said registered openings of each group of blocks and base member end portion on opposite sides of said base member central portion being equidistant from said reference line, and pin members extending through the said registered openings of said groups of blocks and [support] *base* member and securing the said blocks in fixed position on the base member relative to said reference line, said guide blocks being adapted to slidably receive and guide horizontally disposed guillotine gauge blades movable to engage said article being gauged, the horizontal position of said guide blocks being determined by said base member and spacer blocks, the said guide blocks having their sides directed away from said reference line disposed in vertical planes parallel to each other and to said reference line, said vertical planes providing reference for comparison with the positions of said blades.

3. The combination of a base member, an orienting device centrally carried on the base member for orienting an article to be gauged relative to a reference line passing vertically through said base member intermediate of its ends, support means carried by said base member adjacent its opposite ends and embracing said orienting device, each said support means comprising a plurality of guide blocks and spacer blocks alternately arranged and stacked vertically over said base member adjacent a said end, the stack of guide blocks and spacer blocks and said base member having aligned holes in registration with each other, vertically disposed pin members closely fitting in said aligned holes, and securing said blocks in fixed position on said base member relative to said reference line, each said guide block having a horizontally disposed slideway formed therein for slidably receiving a guillotine gauge blade movable therein toward and away from said reference line, each guide block having a side thereof disposed vertically and providing a reference plane for comparing the position of the blade carried by the guide blocks with said reference plane, said sides forming said reference planes of said support means being equidistant from said reference line.

4. The combination of a base member, an orienting device centrally carried on the base member for orienting an article to be gauged relative to a reference line passing vertically through said base member intermediate of its ends, support means carried by said base member adjacent its opposite ends and embracing said orienting device, each said support means comprising a plurality of guide blocks and spacer blocks alternately arranged and stacked vertically over said base member adjacent a said end, the stack of guide blocks and spacer blocks and said base member having aligned holes in registration with each other, vertically disposed pin members closely fitting in said aligned holes, and securing said blocks in fixed position on said base member relative to said reference line, each said guide block having a horizontally disposed slideway formed therein for slidably receiving a guillotine gauge blade movable therein toward and away from said reference line, each guide block having a side thereof disposed vertically and providing a reference plane for comparing the position of the blade carried by the guide block with said reference plane, said sides forming said reference planes of said support means being equidistant from said reference line, the guide blocks and spacer blocks having cut away portions aligned with each other and along said reference planes to provide finger access to said blades inwardly of said blocks.

5. A mounting for guillotine gauge blades movable toward and away from an article to be gauged and on opposite sides thereof, comprising a base member, said base member having a central portion and two end portions on opposite sides of said central portion, said central portion having a round hole extending therethrough, said round hole being adapted for securing an article orienting member to said base member in position relative to a primary reference line, a line coinciding with the axis of said round hole and disposed at right angles to the said base member providing said primary reference line, said base member having round openings extending through said end portions, the axes of said round openings being parallel to said primary reference line and being disposed on secondary reference lines on opposite sides of said primary reference line, said secondary reference lines intersecting at right angles a line passing through said primary reference line, a plurality of guide blocks for slidably receiving and guiding said gauge blades, a plurality of spacer blocks for supporting and fixing the spacing between said guide blocks, said guide blocks and spacer blocks having round openings corresponding in size and spacing with the round openings in the base member end portions, said guide blocks and spacer blocks being grouped in two stacks and alternately arranged in each stack, a group of blocks being positioned over each base member end portion to register the round openings of the stacked blocks with the round openings of the respective base member end portions, and pin members extending through the registered openings to secure the stacks of blocks in position on said base member, each of said guide blocks having a side forming a reference plane for comparison with the position of the gauge blade guided by said guide block, said reference planes being equally spaced from said secondary reference lines, the arrangement of base member, guide blocks, spacer blocks and pin members being such that said sides of the gu locks are positioned in said reference planes relative to aid primary reference line equidistantly on opposite sides f said primary reference line.

6. The combination of a base member, guide blocks nd spacer blocks for mounting a plurality of guillotine auge blades reciprocal in said guide blocks relative to n article to be gauged, said base member having a entrally located primary reference line vertically disposed nd at right angles to the horizontal plane of the base ember, means for securing an article orienting mechaism to said base member to orient an article relative to aid primary reference line, said base member having penings on opposite sides of, and disposed on secondary eference lines equidistantly from, said primary reference ne, said guide blocks and spacer blocks being stacked ver said base member adjacent its opposite ends, said blocks having openings therethrough axially aligned with each other and with openings in said base member, said guide blocks each having a side disposed away from said primary reference line and positioned equidistantly from said secondary reference lines, said sides forming reference planes for comparison with the positions of said gauge blades in the guide blocks, said reference planes being equidistantly spaced from, and on opposite sides of, said primary reference line, *and means, including means secured in said openings in said base member and extending vertically through said aligned openings in stacks of guide blocks, to secure each guide block above said base member in a fixed position relative to said reference lines.*

No references cited.